United States Patent [19]

van Vlaardingen

[11] Patent Number: 5,098,049
[45] Date of Patent: Mar. 24, 1992

[54] BALANCED SUPPORTING ARM

[75] Inventor: Jan van Vlaardingen, Maartensdijk, Netherlands

[73] Assignee: Egripment B.V, Av Nederhorst Den Berg, Netherlands

[21] Appl. No.: 681,050

[22] Filed: Apr. 5, 1991

[30] Foreign Application Priority Data

Apr. 9, 1990 [NL] Netherlands ............ 9000830

[51] Int. Cl.$^5$ ............................................. F16M 3/00
[52] U.S. Cl. ...................... 248/123.1; 248/550; 248/636; 182/19
[58] Field of Search ............. 248/123.1, 550, 636; 182/19, 2; 352/243; 354/81, 293

[56] References Cited

U.S. PATENT DOCUMENTS

| | | | |
|---|---|---|---|
| 3,670,849 | 6/1972 | Milner, Jr. | 182/19 |
| 4,590,634 | 5/1986 | Williams | 182/2 X |
| 4,979,588 | 12/1990 | Pike et al. | 182/19 X |

Primary Examiner—Alvin C. Chin-Shue
Attorney, Agent, or Firm—Hoffmann & Baron

[57] ABSTRACT

The invention relates to a balanced supporting arm, comprising a substantially elongate structural member which is mounted on a supporting assembly for tilting movement and which is provided with at least one bellows mounted under at least one end of the supporting arm. According to the invention, the bellows has an inoperative condition wherein it is at least substantially empty and an operative condition wherein it is filled with a gas under a predetermined working pressure. The balanced supporting arm comprises means for detecting the tilting speed of the supporting arm and, further, means, connected with the means for detecting the tilting speed, for bringing the bellows from the inoperative condition into the operative condition when the means for detecting the tilting speed detect that the tilting speed exceeds a predetermined value.

12 Claims, 3 Drawing Sheets

BALANCED SUPPORTING ARM

The invention relates to a balanced supporting arm, comprising a substantially elongate structural member which is mounted on a supporting assembly for tilting movement and which is provided with at least one bellows mounted under at least one end of the supporting arm.

Such a balanced supporting arm is known from U.S. Pat. No. 3,670,849. Such a balanced supporting arm is generally adapted at one end for receiving a useful load, while at the other end of the structural member, the balanced supporting arm is provided with a balance weight for keeping the supporting arm in equilibrium. Bringing the structural member in the desired tilted position can then be effected through manual effort, but the supporting arm may for this purpose be provided with control means. When the magnitude of the useful load changes, this can be compensated for by adjusting the magnitude of the balance weight, while for a more accurate compensation the balance weight may be designed for at least partial movement along the structural member. For such a compensation, too, control means may be provided.

Such a balanced supporting arm is for example used in film recording. In that case, at the first end of the structural member, the supporting arm is provided with a platform for receiving a camera, which platform may also be suitable for accommodating a cameraman and/or one or more other persons. To increase freedom of movement of the supporting arm, it may also be rotatable about a vertical axis, and the supporting assembly may be mobile, for example by the provision of suitable wheels.

A disadvantage of such balanced supporting arms is that they may become unbalanced, causing an uncontrolled tilting movement of the supporting arm, which does not terminate until the supporting arm abuts another object, generally the floor. This problem may for example occur in a situation where a person enters or leaves the platform, the resultant tilting movement of the supporting arm terminating when the first or the second end strikes against the floor. The accelerations and retardations involved may cause major damage to the apparatus, nor is it at all inconceivable that persons get injured in the process.

To overcome these problems, the bellows referred to serves as a buffer at the time of impact, so that the kinetic energy of the supporting arm generated by the tilting motion is absorbed and the accelerations at the time of impact are reduced.

It may happen, however, that the constant presence of such a bellows is undesirable. It must be borne in mind that such a bellows occupies rather a lot of space and that the above-mentioned situations where collision occurs, make up a comparatively small part of the service time of the supporting arm.

Accordingly, it is an object of the invention to provide a tilting arm wherein the above-mentioned bellows is present in its functional condition only when it is actually necessary to absorb impact energy and wherein, for the rest, the bellows is in a condition wherein it occupies little space. Therefore, according to the invention, the bellows has an inoperative condition wherein it is at least substantially empty and an operative condition wherein it is filled with a gas under a predetermined working pressure, and the balanced supporting arm further comprises means for detecting the tilting speed of the supporting arm and means, connected to said means for detecting the tilting speed, for bringing the bellows from the inoperative condition into the operative condition when the means for detecting the tilting speed detect that the tilting speed exceeds a predetermined value.

In a single embodiment of the invention, the means for detecting the tilting speed comprise a cylinder coupled between the supporting arm and the supporting assembly and a piston movable within said cylinder, said cylinder and piston defining a fluid compartment filled at least partly with a fluid, said fluid compartment being connected with an orifice limiting the flow rate of the fluid, a movable member coupled to said fluid compartment, and a spring member coupled to said movable member for biasing said movable member, and the means for bringing the bellows from the inoperative condition into the operative condition comprise a container filled with a gas under elevated pressure with an outlet opening to be cleared by the movable member.

Further safety is obtained by providing the supporting arm with means which tend to limit the tilting speed during tilting of the supporting arm.

Limitation of the tilting speed of the supporting arm gives people the change to react to the tilting movement of the supporting arm, so that in any case serious injuries can be avoided. Further, the chance of damage in the case of collision with the floor, for example, is reduced considerably. Furthermore, control means, if any, are given time to react to the tilting movement of the supporting arm, for example by varying the distance from the balance weight to the fulcrum point, so that the tilting movement can be stopped before the supporting arm strikes against another object. All in all, the number of times that a situation occurs where the bellows must be inflated, is reduced.

In an advantageous embodiment, the tilting speed limiting means comprise a first cylinder coupled between the supporting arm and the supporting assembly and a first piston movable within said first cylinder, which first cylinder and first piston define a first fluid compartment at least partly filled with a fluid, which compartment is connected with an orifice limiting the flow rate of the fluid.

Preferably, the magnitude of the flow rate of the fluid, limited by the orifice, is adjustable.

A preferred embodiment comprises a second cylinder and a second piston movable therein, wherein a second fluid compartment communicates via said orifice with the first fluid compartment of the first cylinder/piston combination.

In an advantageous embodiment, said first cylinder and said first piston are provided by said cylinder and said piston of said tilting speed detecting means.

When the bellows is loaded by its taking up impact energy, it will be compressed, so that the pressure of the fluid present therein will increase. The higher the pressure, the more energy is taken up by the bellows. However, when the pressure becomes too high, the bellows might tear, so that the energy absorbent effect will be lost entirely. Therefore, the bellows is preferably provided with an outlet opening, which is preferably connected to a safety valve.

Hereinafter, by way of example only, the invention will be further elucidated by description of embodiments of the apparatus according to the invention, with reference to the accompanying drawings, in which:

FIG. 1 is a diagrammatic elevational view of a first embodiment of balanced supporting arm according to the invention;

FIGS. 2A-B are views of detailed modifications of the balanced supporting arm shown in FIG. 1;

Figure 1:
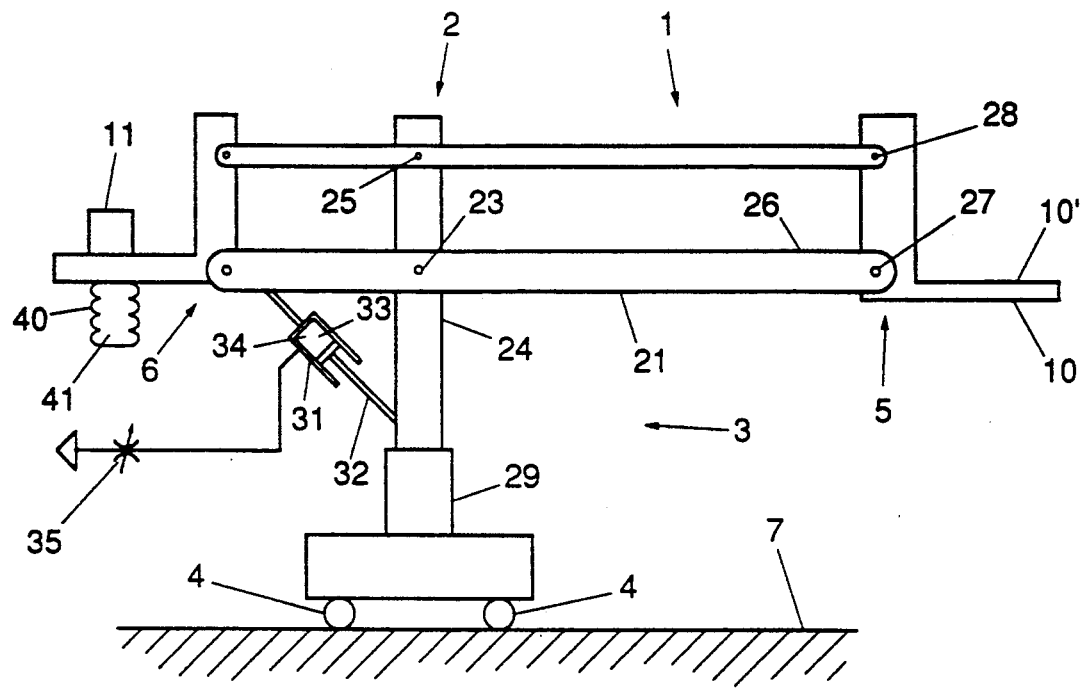

In FIGS. 1-6, a balanced supporting arm, generally indicated at 1, is mounted at the fulcrum point 2 on a supporting assembly 3 for tilting movement, the supporting assembly 3 in the embodiment shown being provided with wheels 4 for moving it over a floor 7. At a first end 5, the supporting arm 1 is adapted for receiving a useful load, and at the other end 6, the supporting arm 1 is provided with a balance weight 11 for keeping the supporting arm 1 in equilibrium. In the embodiment shown, the supporting arm 1 is adapted for use in film recording and, for that purpose, is provided at the first end 5 with a platform 10 for receiving a camera.

When the magnitude of the useful load changes, for example due to the arrangement of a camera, this is compensated for by changing the magnitude of the balance weight 11, for example by adding an additional weight element. For implementing small corrections, at least a part of the balance weight 11 may be adapted for displacement, so that the distance from the centre of gravity of the balance weight 11 to the fulcrum point 2 can be varied. This may be effected by manual effort, but, if so desired, the supporting arm 1 may be provided with control means for this purpose.

By means of manual effort, the supporting arm 1 can be brought into a desired tilted position, i.e. at a desired angle relative to the horizontal, so that the platform 10 can be carried to a desired level relative to the floor 7. If so desired, the supporting arm 1 may be provided with control means for that purpose, too.

More particularly, the supporting arm 1 comprises a first beam 21 mounted for rotation about a horizontal axis 23 on an externally cylindrical member 24, and a second beam 22 which, in spaced relationship to the first beam 21, is mounted on the member 24 for rotation about the horizontal axis 25. The horizontal axis 25 is oriented parallel to the horizontal axis 23. At a first end 26, the first beam 21 is mounted on the platform 10 for rotation about a horizontal axis 27, while in similar manner the second beam 22 is mounted to the platform 10 for rotation about a horizontal axis 28. The horizontal axes 27 and 28 are oriented parallel to the horizontal axes 23 and 25, and the beams 21 and 22 are parallel to each other, so as to accomplish the platform 10 having a horizontal support surface 10' in any tilted position of the supporting arm 1. The externally cylindrical member 24 is mounted in an internally cylindrical member 29 to enable rotation of the supporting arm 1 about a vertical axis.

In the first embodiment of the supporting arm according to the invention as shown in FIG. 1, a first cylinder 31 is coupled to the supporting arm 1, and a piston 32 adapted for movement within the first cylinder 31 is coupled to the externally cylindrical member 24 of the supporting assembly. Although this is not explicitly shown in the drawings, the first cylinder 31 is hingedly coupled to the supporting arm 1 and the member 24 so as to allow for the tilting movement, as is well known per se. In the cylinder 31, the piston 32 defines a compartment 33 for receiving a fluid 34, preferably air. Via an orifice 35, the compartment 33 communicates with a reservoir (not shown) for the fluid 34, which reservoir is furnished in a simple manner by the outside air when air is used as the fluid 34. The orifice 35 may have a fixed magnitude, but preferably the magnitude of the orifice 35 is adjustable.

When the supporting arm 1 tilts, piston 32 is displaced within cylinder 31, so that the magnitude of compartment 33 is changed. As a result, fluid 34 is forced to flow through orifice 35 and a back pressure on piston 32 is generated. The magnitude of orifice 35 determines an upper limit for the amount of fluid 34 that can flow through it per unit of time. When the flow rate of the fluid is lower than the maximum rate of flow through the orifice 35 as determined by the magnitude of the orifice 35, the back pressure on the piston 32 will be slight, so that the tilting movement of the supporting arm 1 is slowed down to a slight extent. When the amount of fluid 34 displaced by the piston 32 per unit of time is larger than the amount that can actually flow through the orifice per unit of time, the back pressure on the piston 32 increases, whereby the movement of the piston 32, and hence the tilting movement of the supporting arm 1, is strongly slowed down.

Figure 2A:
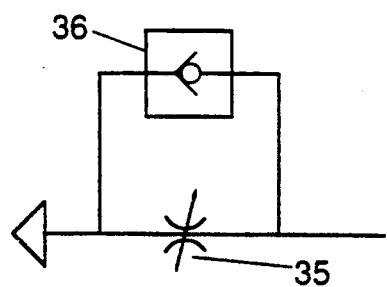
Figure 2B:
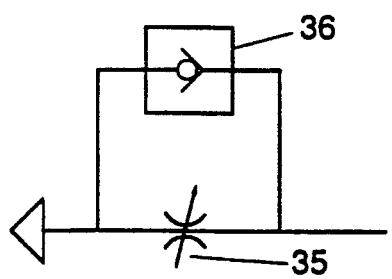

It is observed that in the embodiment discussed, the speed limiting means 31,32 are active in two directions in that they effect a speed limitation both when the piston 32 moves into the cylinder 31 and when the piston 32 moves out of the cylinder 31. When it is desirable for the speed limiting means 31,32 to be active in only one direction, a valve 36, for example, may be coupled in parallel to the orifice 35. FIG. 2A shows how such a valve 36 may be mounted when the speed limitation must be effected when the platform 10 moves upwards in the situation as illustrated in FIG. 1, while FIG. 2B shows how such a valve 36 may be mounted when the speed limitation is to be effected when the platform 10 moves downwards in the situation as illustrated in FIG. 1.

In the embodiment shown, the orifice 35 is connected to the wall of the cylinder 35 via a duct. It will be clear, however, that the orifice 35 may also be connected to the wall of the piston 32 or, for example, mounted in the wall of the cylinder 31 itself. Further, it will be clear that the operation of the speed limiting means 31,32 is the same when the piston 32 is coupled to the supporting arm 1 and the cylinder 31 is coupled to the externally cylindrical member 24 of the supporting assembly.

Figure 3:
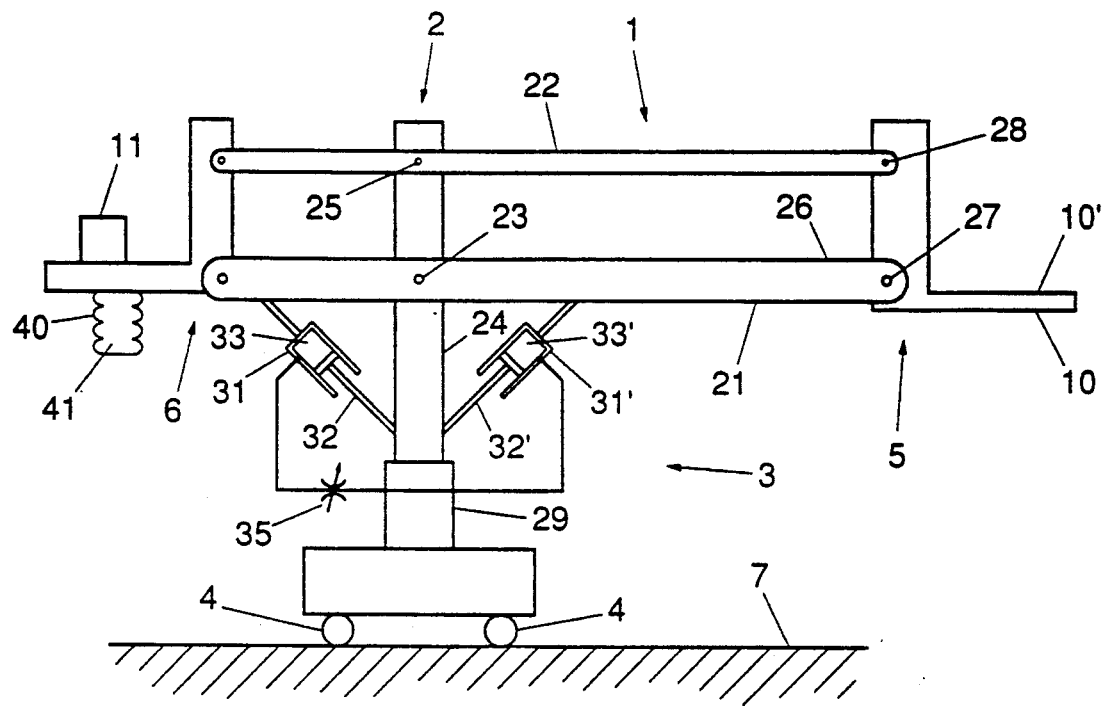
FIG. 3 is a diagrammatic elevational view of a second embodiment of a balanced supporting arm according to the invention.

FIG. 3 illustrates an embodiment of the supporting arm 1, comprising two pairs of speed limiting means 31,32 and 31',32', operating in parallel. The speed limiting means 31',32' have the same structure and operation as described hereinabove with reference to the speed limiting means 31,32. However, the speed limiting means 31',32' are coupled between the supporting assembly 3 and a remote side of the supporting arm 1 relative to the fulcrum of the speed limiting means 31,32. Via orifice 35, compartment 33' communicates with compartment 33, so that these compartments mutually serve as reservoirs. In the arrangement of the speed limiting means 31,32 and 31',32', as illustrated, they enhance each other's action, while also in the case where the fluid used is not air, the provision of a separate reservoir for the fluid can be omitted.

In the embodiment shown, the supporting arm 1 is provided according to the invention with a bellows 40 mounted under the second end 6 of the supporting arm 1. It will be clear that the supporting arm 1 may also be provided with a bellows mounted under the first end 5 of the supporting arm 1. The bellows 40 is filled with gas 41 under elevated pressure, preferably air, and serves to absorb the kinetic energy generated by the tilting motion when the supporting arm 1 strikes the floor. The absorbent effect of the bellows 40 is based on the fact that compression of the bellows 40 requires work. According as the bellows 40 is compressed further, more work is required for the purpose, i.e. more energy is absorbed by the bellows 40.

Figure 4:
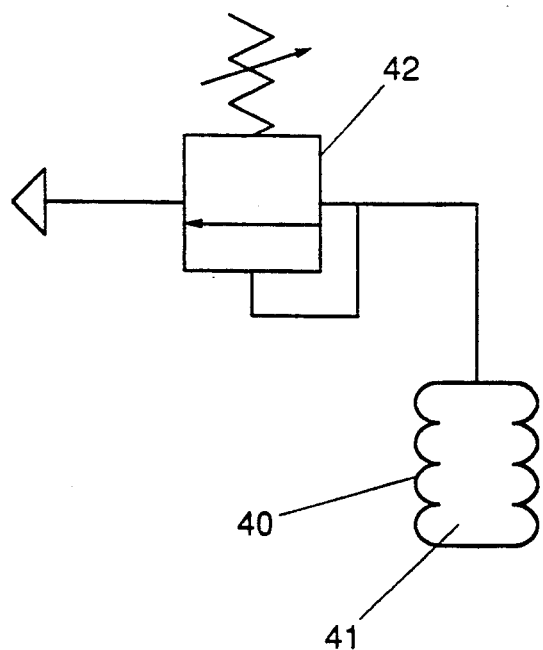
FIG. 4 is a diagrammatic view of a detail of the balanced supporting arm shown in FIG. 1.

When the bellows 40 is being compressed, the pressure of the gas 41 present therein will increase. To prevent the pressure in the bellows 40 from becoming so high that the bellows 40 will collapse, the bellows 40 may communicate with a safety valve 42 which opens when the pressure in the bellows 40 exceeds a predetermined value, as shown in FIG. 4.

As noted above, further compression of the bellows 40 requires more work. Conversely, this means that when it is desirable for the bellows 40 to absorb a lot of energy, for example because the supporting arm 1 has a great mass, the bellows 40 must be comparatively large. Essentially, the provision of the bellows 40 is a safety measure which generally does not become operational until the tilting speed of the supporting arm 1 becomes greater than is considered acceptable. Accordingly, in principle only in exceptional cases is there a need for calling upon the energy absorbent action of the bellows 40. Apart from such exceptional cases, in itself the presence of the bellows 40 is unnecessary and may even be undesirable.

Figure 5:
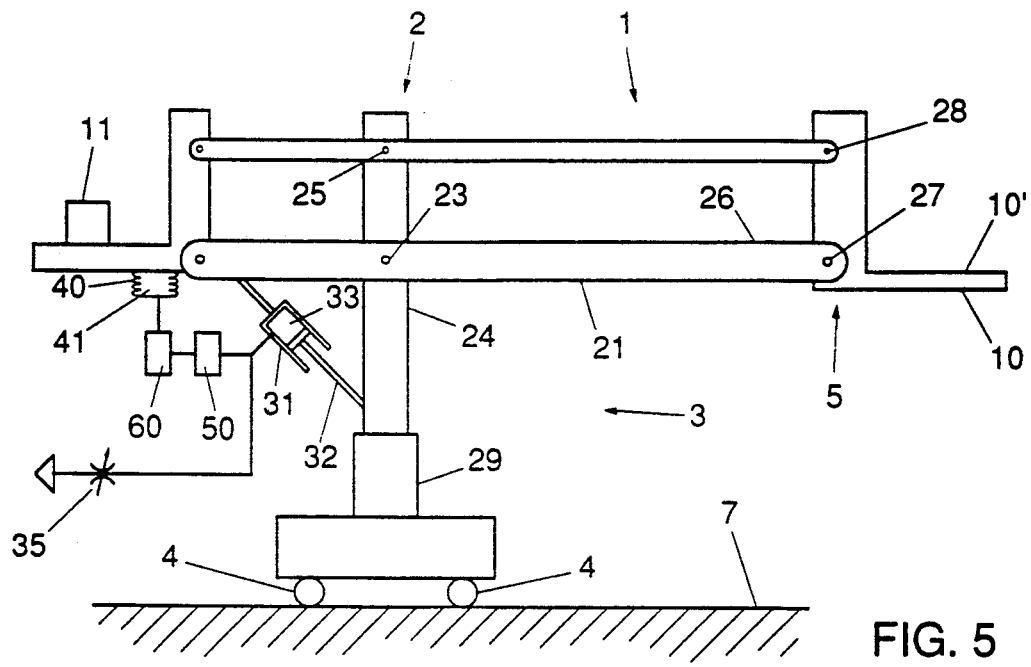
FIG. 5 is a diagrammatic elevational view of a third embodiment of a balanced supporting arm according to the invention.

FIG. 5 shows that according to the invention this drawback has been obviated, reference numerals identical to those of the preceding figures indicating corresponding parts.

FIG. 5 shows the bellows 40 in an inoperative condition wherein the bellows 40 is at least substantially empty. The bellows 40 can be brought from this inoperative condition into an operative condition wherein the bellows 40 is filled with a gas 41 under a predetermined working pressure. The supporting arm 1 comprises means 50 for detecting the tilting speed of the supporting arm 1 and means 60, connected to the tilting speed detecting means 50, for bringing the bellows 40 from the inoperative condition into the operative condition when the tilting speed detecting means 50 detect that the tilting speed of the supporting arm 1 exceeds a predetermined value. In the embodiment shown in FIG. 5, the means 50 detect the tilting speed of the supporting arm 1 by detecting the pressure in the fluid compartment 33 of the cylinder 31, but it will be clear that other types of means for detecting the tilting speed of the supporting arm 1, for example electronic types, may also be suitable. The embodiment shown in FIG. 5, however, is preferred, because it does not require the presence of an external source of energy such as a battery.

Figure 6:
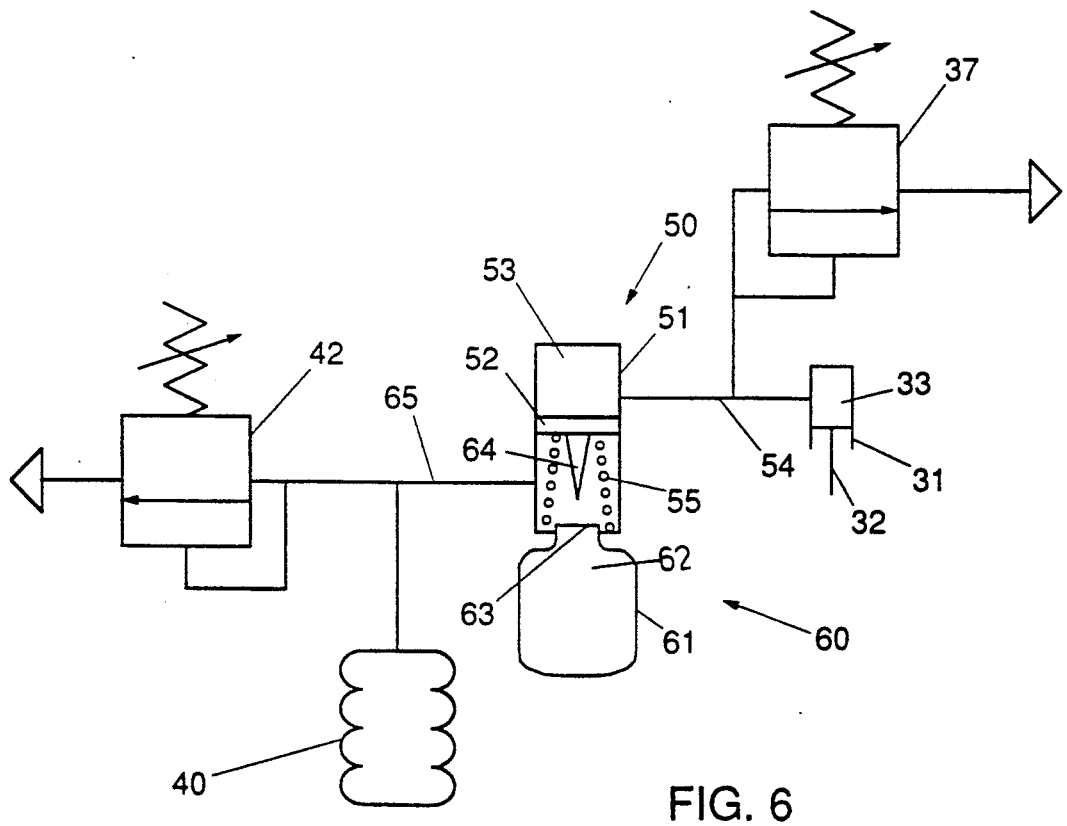
FIG. 6 is a diagrammatic view of a detail of a preferred embodiment of the balanced supporting arm shown in FIG. 5.

FIG. 6 shows a preferred embodiment of the means 50 and 60 of FIG. 5. The tilting speed detecting means 50 comprise a cylinder 51 and a piston 52 movable therein. A fluid compartment 53 of the cylinder 51 communicates with the fluid compartment 33 of the cylinder 31 via a duct 54. When the supporting arm 1 tilts in such a way that the platform 10 moves upwards, the piston 32 is moved further into the cylinder 31 so that the magnitude of the compartment 33 decreases. When the tilting speed of the supporting arm 1 is so high that the amount of fluid displaced by the piston 32 per unit of time is larger than the amount of fluid that can flow through the orifice 35 per unit of time, the pressure in the fluid compartment 33 of the cylinder 31 increases, so that the pressure in the fluid compartment 53 of the cylinder 51 will also increase, so that the piston 52 is displaced outwardly against the spring force of a spring member 55. The greater the tilting speed of the supporting arm 1, the greater the pressure in the fluid compartment 33 and, accordingly, the greater the displacement of the piston 52.

The means 60 serving to bring the bellows 40 from the inoperative condition into the operative condition comprise a container 61 filled with a gas, for example air, under elevated pressure, which container 61 comprises an outlet opening 62 which is closed off in the inoperative condition of the bellows 40. The outlet opening 62 is cleared by the piston 52 when the piston 52 has reached a predetermined displacement which corresponds to a predetermined maximum allowable tilting speed of the supporting arm 1. In the embodiment shown, for that purpose, the outlet opening 62 is closed off by a plate or membrane 63, and the piston 52 has a sharp member 64 connected to it for piercing the plate or membrane 63.

When the outlet opening 62 is cleared, the gas can flow from the container 61 via a duct 65 into the bellows 40, so that it is brought from the inoperative condition into the operative condition. As shown, the bellows 40 may be provided with a safety valve 42, as discussed with reference to FIG. 4.

FIG. 6 further shows that a safety valve 37 may be connected to the fluid compartment 33 of the cylinder 31, the operation of valve 37 being comparable to that of the safety valve 42. The safety valve 37 limits the pressure in the fluid compartment 33 to a predetermined value, in order to limit the braking action of the tilting speed limiting means 31,32 on the supporting arm 1 so as to avoid any undesirably great reaction forces on the tilting speed limiting means 31,32 and on the supporting arm 1. Great reaction forces may be undesirable, because they lead to damage of the construction and, particularly in the case of a mobile supporting assembly 3, may even result in the tilting of the supporting assembly.

It will be clear to any one skilled in the art that it is possible to change or modify the embodiment shown of the apparatus according to the invention, without departing from the concept of the invention or its scope of protection. Thus, for example, in the embodiment shown in FIGS. 5–6, a blocking valve may be provided in series with the orifice 35. At normal working pressures in the fluid compartment 33 of the cylinder 31, this blocking valve is open, so that the operation of the apparatus will be as described hereinabove. When the working pressure in the fluid compartment 33 of the cylinder 31 exceeds a predetermined adjustable threshold level of the blocking valve, this blocking valve will close, so that the orifice 35 is blocked, so that the means 50 and 60 will react faster.

I claim:

1. A balanced supporting arm, comprising a substantially elongate structural member which is mounted on a supporting assembly for tilting movement and which is provided with at least one bellows mounted under at least one end of the supporting arm, characterized in that:

the bellows has an inoperative condition wherein it is at least substantially empty and an operative condition wherein the bellows is filled with a gas under a predetermined working pressure;

the balanced supporting arm comprises means for detecting the tilting speed of the supporting arm;

and that the balanced supporting arm comprises means, connected with said means for detecting the tilting speed, for bringing the bellows from the inoperative condition into the operative condition when the means for detecting the tilting speed detect that the tilting speed exceeds a predetermined value.

2. Apparatus as claimed in claim 1, characterized in that: the tilting speed detecting means comprise a cylinder coupled between the supporting arm and the supporting assembly and a piston movable within said cylinder, said cylinder and piston defining a fluid compartment filled at least partly with a fluid, said fluid compartment being connected with an orifice limiting the flow rate of the fluid, a movable member coupled to said fluid compartment, and a spring member coupled to said movable member for biasing said movable member; and that the means for bringing the bellows from the inoperative condition into the operative condition comprise a container filled with gas under elevated pressure, said container comprising an outlet opening which can be cleared by said movable member.

3. Apparatus as claimed in claim 1, characterized by means for limiting the tilting speed of the supporting arm.

4. Apparatus as claimed in claim 3, characterized in that the tilting speed limiting means comprise a first cylinder coupled between the supporting arm and the supporting assembly and a first piston movable within said first cylinder, which first cylinder and first piston define a first fluid compartment filled at least partly with a fluid, said first fluid compartment being connected with an orifice limiting the flow rate of the fluid.

5. Apparatus as claimed in claim 4, characterized in that the magnitude of the flow rate of the fluid, limited by the orifice, is adjustable.

6. Apparatus as claimed in claim 4, characterized by a second cylinder and a second piston movable within said second cylinder, having a second fluid compartment connected via said orifice with said first fluid compartment of said first cylinder/piston assembly.

7. Apparatus as claimed in claim 4, characterized in that said first cylinder and said first piston are provided by said cylinder and said piston of said tilting speed detecting means.

8. Apparatus as claimed in claim 3, characterized in that the tilting speed limiting means comprise means for limiting the braking action of the tilting speed limiting means.

9. Apparatus as claimed in claim 8, characterized in that the limiting means comprise a safety valve.

10. Apparatus as claimed in claim 1, characterized in that the bellows is provided with an outlet opening.

11. Apparatus as claimed in claim 10, characterized in that the outlet opening is connected with a safety valve.

12. Apparatus as claimed in claim 2 further comprising means for limiting the tilting speed of the supporting arm.

* * * * *